(12) United States Patent
Fleming et al.

(10) Patent No.: US 10,203,467 B2
(45) Date of Patent: Feb. 12, 2019

(54) NETWORK EQUIPMENT ACCESS CONTROL SYSTEMS

(71) Applicant: Telect, Inc., Liberty Lake, WA (US)

(72) Inventors: Samuel Cameron Fleming, Spokane, WA (US); David Knaggs, Spokane, WA (US)

(73) Assignee: Telect, Inc., Liberty Lake, WA (US)

( * ) Notice: Subject to any disclaimer, the term of this patent is extended or adjusted under 35 U.S.C. 154(b) by 0 days.

(21) Appl. No.: 15/592,977

(22) Filed: May 11, 2017

(65) Prior Publication Data

US 2017/0336590 A1 Nov. 23, 2017

Related U.S. Application Data

(60) Provisional application No. 62/340,260, filed on May 23, 2016.

(51) Int. Cl.
*G02B 6/44* (2006.01)
*G07C 9/00* (2006.01)

(52) U.S. Cl.
CPC ......... *G02B 6/4469* (2013.01); *G02B 6/4452* (2013.01); *G02B 6/4453* (2013.01); *G07C 9/00031* (2013.01); *G07C 9/00103* (2013.01); *G07C 9/00309* (2013.01)

(58) Field of Classification Search
CPC .. G02B 6/4469; G02B 6/4452; G02B 6/4453; G07C 9/00031; G07C 9/00103; G07C 9/00309
See application file for complete search history.

(56) References Cited

U.S. PATENT DOCUMENTS

| | | | | |
|---|---|---|---|---|
| 8,650,805 | B1 * | 2/2014 | Poleshuk | H04Q 1/025 312/223.6 |
| 2004/0151168 | A1 * | 8/2004 | Phillips | H04L 63/02 370/359 |
| 2016/0344590 | A1 * | 11/2016 | Huey | H04L 41/0893 |

\* cited by examiner

*Primary Examiner* — Leon Flores
(74) *Attorney, Agent, or Firm* — Lee & Hayes, P.C.

(57) ABSTRACT

Monitoring and access control systems for network communication equipment of a network facility. A login device, to receive a credential of a user, is associated with a piece of network communication equipment arrangeable in a network facility. A monitor device is associated with the piece of network communication equipment to receive data associated with an access of the piece of network communication equipment. And, the data associated with the access of the piece of network communication equipment is auditable by a party to provide accountability of services performed on the piece of network communication equipment arrangeable in the network facility. A security device arranged with the piece of network communication equipment may un-lock or lock a portion of the piece of network communication equipment based at least in part on the credential received from the user.

25 Claims, 11 Drawing Sheets

NETWORK EQUIPMENT ACCESS CONTROL SYSTEMS

RELATED APPLICATION

This application claims the benefit of priority to provisional U.S. Patent Application Ser. No. 62/340,260, filed on May 23, 2016 and entitled "Network Equipment Access Control Systems", which is herein incorporated by reference in its entirety.

TECHNICAL FIELD

This application relates to systems and methods of managing access to network communication equipment.

BACKGROUND

Network or datacenter facilities provide storage space, power, bandwidth, and HVAC (heating, ventilation, and air conditioning) for equipment such as network communication equipment, servers, data storage equipment, etc. As the network facilities expand, controlling access to the equipment is a much larger issue. For example, controlling access to the equipment arranged in the network facility is not just controlling access of a company to its equipment, it also involves controlling access of the provider of the network facility to the equipment. With the increase of access to the network facility, systems and methods for access control to the equipment in the network facility are desired by customers. For example, parties or customers may desire to monitor and/or control access by each piece of equipment arranged in the storage space within a network facility.

Existing access control methods are very coarse. For instance, access control systems and methods have traditionally been utilized at a room (e.g., cage) level. For example, a party (e.g., a customer, an organization, an entity) may simply monitor the equipment arranged in the room to detect a problem and/or receive a new service request to be added, and based on the monitoring and/or the request, the party may instruct the provider of the network facility to correct the detected problem and/or address the request to add the new service. While this approach helps ensure that the provider of the network facility is at least documented, it does not provide visibility to services performed on each piece of equipment arranged in the room. Having the visibility to services performed on each piece of equipment arranged in the room, would provide a party the ability to monitor each piece of equipment arranged in the room and increase accountability of the services performed on the equipment.

Furthermore, a party's ability to individually control access to each piece of equipment disposed in the network facilities is also desired by parties. For example, today's parties may be capable of controlling access to the room containing the equipment. However, a party may desire to control not only access to the room, but also control access to each piece of equipment arranged in the room. Moreover, a party may desire to control not only access to the room, but also control access to each node or circuits of network connectivity. Having the ability to control access to each piece of equipment arranged in the room, would provide a party the ability to reduce negligence and improve network reliability for the equipment.

Accordingly, there remains a need in the art for individual equipment access control and monitoring to increase accountability and improve network performance.

SUMMARY

This summary is provided to introduce simplified concepts for monitoring and controlling access of a piece of network communication equipment arranged in a room of a network facility, which is further described below in the Detailed Description. This summary is not intended to identify essential features of the claimed subject matter, nor is it intended for use in determining the scope of the claimed subject matter.

In one example, a network facility may include a piece of network communication equipment disposed in a room of the network facility and communicatively coupled to a panel (e.g., a demarcation panel) disposed in the same room. A login device may be associated with the piece of network communication equipment. The login device may receive a credential of a first user of a first party or a second user of a second party, where the first party and the second party are not affiliated. A monitor device may be associated with the piece of network communication equipment, and may receive data associated with an access, by the first user or the second user, of the piece of network communication equipment. The data associated with the access of the piece of network communication equipment may then be audited by the second party to determine accountability of services performed on the piece of network communication equipment arranged in the room. Additionally, or alternatively, the data may be used in other manners.

In another example, the network facility may include a fiber optic system disposed in a room of the network facility and communicatively coupled to a demarcation panel disposed in the same room. A login device may be associated with the fiber optic system. The login device may receive a credential of a first user of a first party or a second user of a second party, where the first party and the second party are not affiliated. A monitor device may be associated with the fiber optic system, and may receive data associated with an access, by the first user or the second user, of the fiber optic system. The data associated with the access of the fiber optic system may then be audited by the second party to determine accountability of services performed on the fiber optic system arranged in the room. Additionally, or alternatively, the data may be used in other manners.

In another example, the network facility may include a power distribution system disposed in a room of the network facility and communicatively coupled to a demarcation panel disposed in the same room. A login device may be associated with the power distribution system. The login device may receive a credential of a first user of a first party or a second user of a second party, where the first party and the second party are not affiliated. A monitor device may be associated with the power distribution system, and may receive data associated with an access, by the first user or the second user, of the power distribution system. The data associated with the access of the power distribution system may then be audited by the second party to determine accountability of services performed on the power distribution system arranged in the room. Additionally, or alternatively, the data may be used in other manners.

BRIEF DESCRIPTION OF THE DRAWINGS

The detailed description is described with reference to the accompanying figures. The use of the same reference numbers in different figures indicates similar or identical items.

DETAILED DESCRIPTION

Overview

This disclosure is directed to a network communication monitoring and access control system and method. In some of the monitoring system implementations, a login device and/or a monitor device may be associated with a node, a circuit of network connectivity, a piece of network communication equipment, etc. The node may be a connection point, a redistribution point, or a communication endpoint (e.g. data terminal equipment). The monitoring device may receive a credential of a first user of a first party or a credential of a second user of a second party not affiliated (e.g., associated or connected) with the first party, and the monitor device may receive data associated with an access, by the first user or the second user, of the piece of network communication equipment. In some of the access control system implementations, a security device may be arranged with the piece of network communication equipment. The security device may un-lock or lock a portion of the piece of network communication equipment based at least in part on the credential received from the first user or the second user.

This disclosure describes systems and methods for monitoring and controlling access of each piece of network communication equipment disposed in respective rooms of respective network sites, which may increase accountability, reduce costs for unexpected network communication equipment failures, and/or improve network performance. To achieve these systems, in one example this application describes a network facility having a login device and a monitoring device associated with the piece of network communication equipment. The login device may receive a credential of a first user of a first party or a second user of a second party, and the monitoring device may receive data associated with an access, by the first user or the second user, of the piece of network communication equipment. In another example this application describes a network facility having a security device arranged with the piece of network communication equipment. The security device may un-lock or lock a portion of the piece of network communication equipment based at least in part on the credential received from the first user or the second user.

Example Environment

Figure 1:
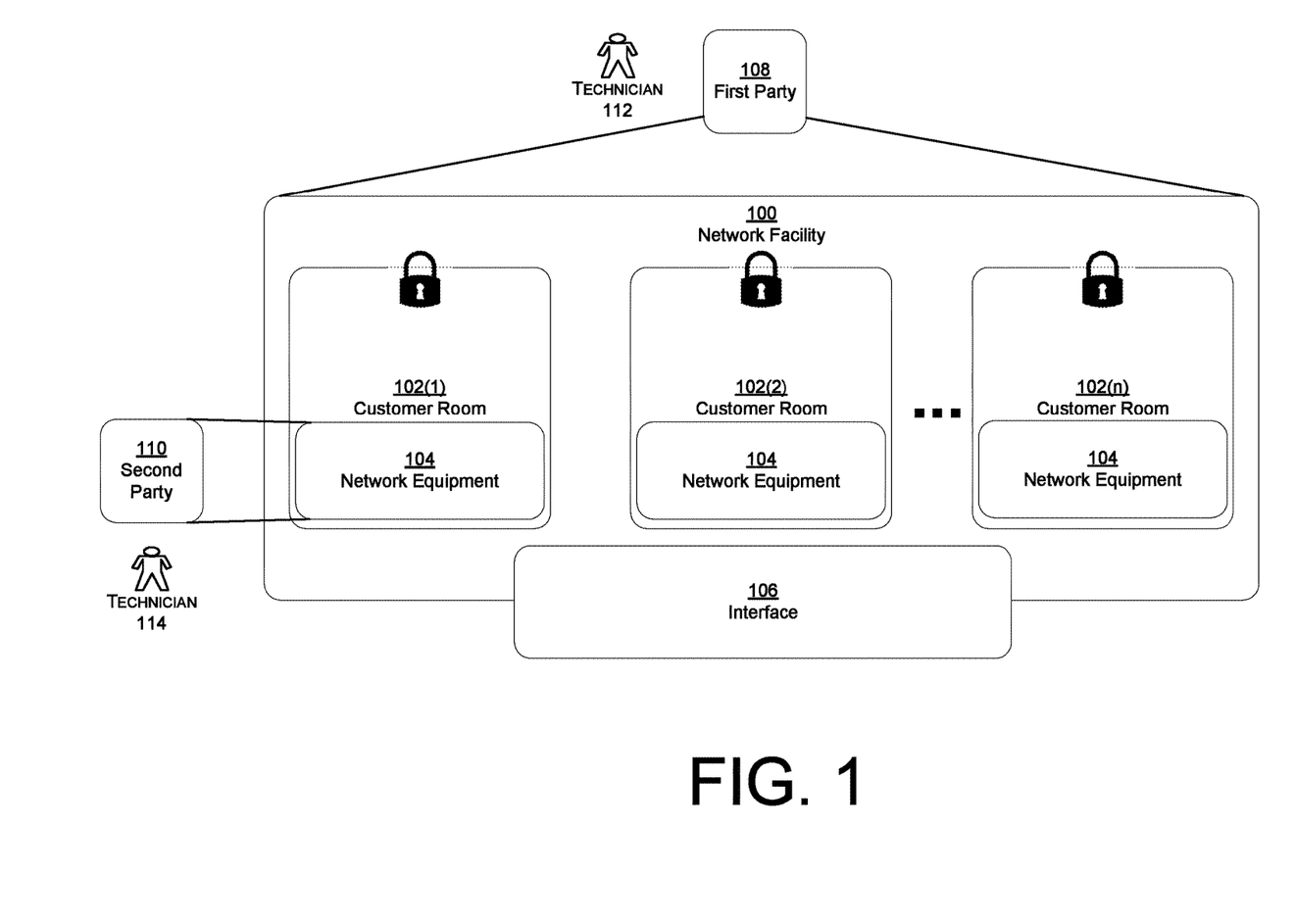
FIG. 1 illustrates an example network facility including a plurality of customer rooms having network communication equipment disposed in the customer rooms.

FIG. 2 illustrates an example network facility 100 including a plurality of customer rooms 102(1), 102(2), through 102(n) having network communication equipment 104 disposed in the customer rooms 102(1)-102(n). The network facility 100 may include an interface 106 for receiving fiber, optical fiber, power, etc. Optical fiber and/or power may be distributed to one or more of the customer rooms 102(1)-102(n) and/or the network communication equipment 104 disposed in the customer rooms 102(1)-102(n).

The network facility 100 may form a part of a network, a content delivery network, a distribution network, a data center, etc., and may be operated or owned by a first party 108 (e.g., an owner, a landlord, a lessor, etc.) associated with the network facility 100. One or more of the customer rooms 102(1)-102(n) may be leased from the first party 108 by a second party 110 (e.g., a tenant, a lessee, a renter, etc.). The customer rooms 102(1)-102(n) may be, for example, lockable rooms, lockable cages, lockable cabinets, lockable frames (e.g., network bays, unequal flange racks, purpose built frames, etc.) having respective infrastructure, network connectivity, power, physical security, etc. suitable for network communication equipment, servers, data storage equipment, networking equipment etc. The second party 110 may be a network communication company, a network provider, a data service provider, a web commerce company, a major enterprise (e.g., auto manufacture, insurance company, government agency, etc.), electronic commerce site, etc. Moreover, the first party 108 may not be affiliated with the second party 110.

The second party 110 may operate or own the network communication equipment 104 disposed in the customer rooms 102(1)-102(n). In some examples, when a problem is detected with one or more of the network communication equipment 104, or a new service is requested, the second party may request, order, schedule, etc. an installation and/or maintenance of the network communication equipment 104 disposed at the network facility 100 by a first user 112 of the first party 108, or by a second user 114 of the second party 110. The first user 112 and/or the second user 114 may be, for example, a technician, an installer, an employee, etc. trained to perform the installation and/or maintenance of the network communication equipment 104 disposed at the network facility 100.

Figure 2:
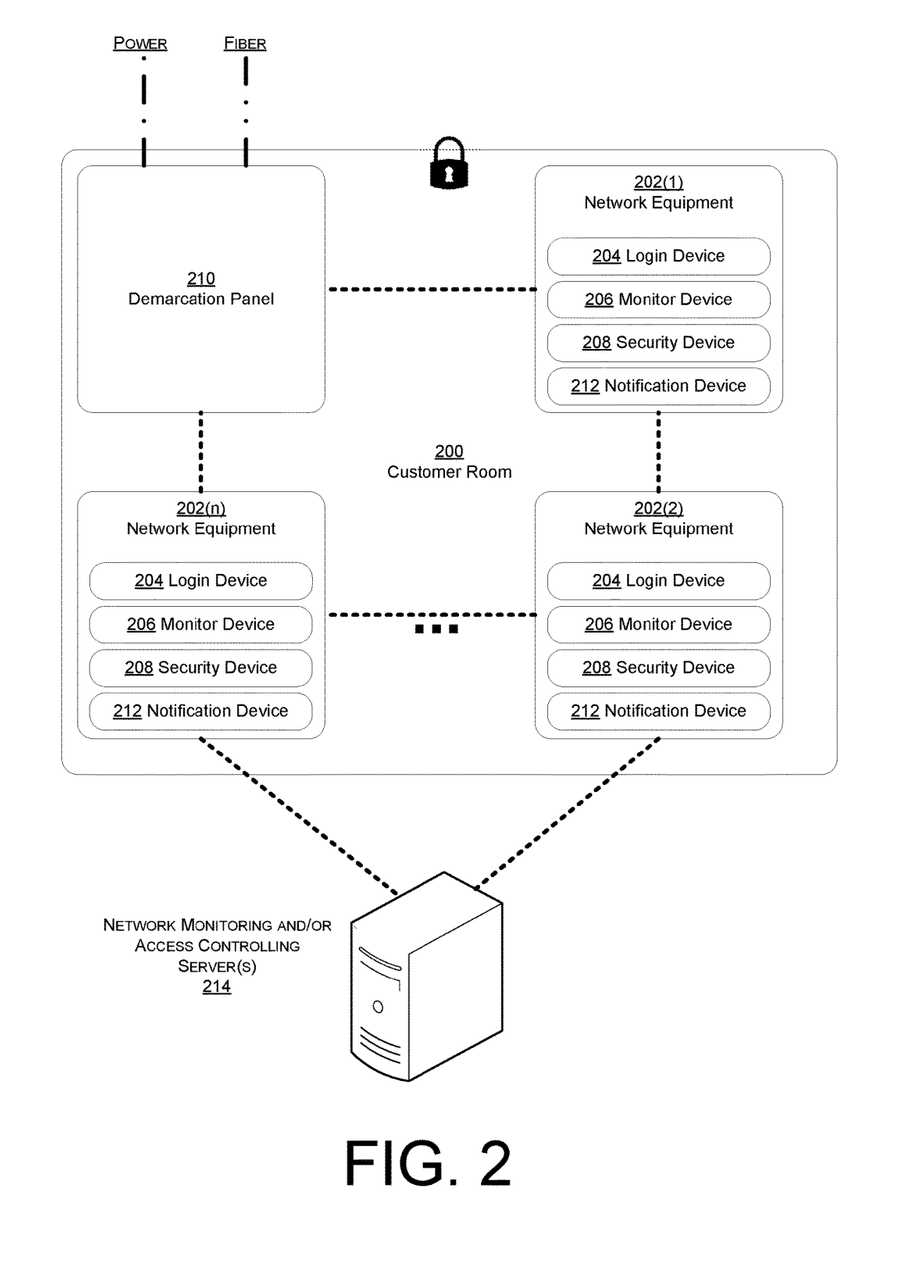
FIG. 2 illustrates an example implementation of a customer room having network communication equipment having a login device, a monitor device, and a security device for use in the example network facility shown in FIG. 1.

FIG. 2 illustrates an example implementation of a customer room 200 having network communication equipment 202(1), 202(2) through 202(n) that may have a login device 204, a monitor device 206, and/or a security device 208 for use in the example network facility 100 shown in FIG. 2. The example implementation of the customer room 200 can be one of the customer rooms 102(1)-102(n) shown in FIG. 1. One or more of the network communication equipment 202(1)-202(n) may be a piece of network communication equipment communicatively coupled (represented by dashed lines) to the demarcation panel 210, and operated by the second party 110 not affiliated with the first party 108. In one example, the piece of network communication equipment may be a fiber optic panel (e.g., a unit providing a location for patch or splice connection of fiber optic cables, a patch panel, a cross connect panel, a splice panel, a bulkhead, an LGX panel, etc.) or a power distribution panel (e.g., a breaker panel, a fuse panels, a GMT panel, etc.). The piece of network communication equipment may be arranged in a data center rack (DCR) disposed in the customer room 200. For example, a patch panel may be mounted in the DCR.

The demarcation panel 210 may be disposed in the customer room 200 and operated by the first party 108. For example, the demarcation panel 210 may be a point where a portion of the power and/or fiber optics owned by the first party 108 meets a portion of the power and/or fiber optics owned by the second party 110. The point where the portion of the power and/or fiber optics owned by the first party 108 meets the portion of the power and/or fiber optics owned by the second party 110 defines the demarcation panel 210.

The login device 204 may receive a credential of the first user 112 of the first party 108 or a second user 114 of the second party 110. In one example, the login device 204 may receive the credential of the first user 112 of the first party 108 or a second user 114 of the second party 110 via a radio-frequency identification (RFID), a keypad, a key fob, a smart card, etc. In another example, the login device 204 may receive the credential of the first user 112 of the first party 108 or a second user 114 of the second party 110 via an application (e.g., a mobile application, a Bluetooth application, etc.).

The monitor device 206 may receive data associated with an access, by the first user 112 or the second user 114, of the piece of network communication equipment. For example, the monitor device 206 may receive data associated with the first user 112 or the second user 114 accessing a tray, a circuit (e.g., a single fiber optic transmission path for transmitting data), a switch, a breaker, a fuse of the piece of network communication equipment. In one example, the data associated with the access of the piece of network communication equipment may include first data representing the first user 112 or the second user 114 starting to access (e.g., opening, switching, turning, moving, displacing, etc.) the piece of network communication equipment, and second data representing the first user 112 or the second user 114 stopping access (e.g., closing, switching, turning, moving, displacing, etc.) to the piece of network communication equipment. In another example, the monitor device 206 may receive data associated with a change of a position of the piece of network communication equipment. For example, the monitor device may receive data associated with a detection of individual adapters, switches, breakers, fuses, trays, etc. being moved or displaced. The data associated with the access of the piece of network communication equipment may be auditable by the second party 110 to provide accountability of services performed on the piece of network communication equipment arranged in the customer room 200. For example, the login device 204, the monitor device 206, the security device 208, a control board, a central control board, etc., may send the received data associated with the access of the piece of network communication equipment to a server operated by the second party 110. As discussed in more detail below, the server may be configured to integrate the received data from the monitor device 206, the security device 208, the control board, the central control board, etc. to allow a user (e.g., an auditor(s)) to audit an access of each piece of network communication equipment of each collocation facility, audit an installation of a piece of network communication equipment of each collocation facility, audit a servicing and/or maintenance of each piece of network communication equipment of each collocation facility. A user may then make more informed decisions regarding accountability maintenance of each collocation facility.

The security device 208 may un-lock or lock a portion of the piece of network communication equipment. For example, the security device may un-lock or lock a tray, a circuit (e.g., a single fiber optic transmission path for transmitting data), a switch, a breaker, a fuse of the piece of network communication equipment, based at least in part on the credential received from the first user 112 or the second user 114. In one example the security device may comprise an electric lock. For example, the security device may comprise a solenoid, a solenoid bolt, an electro-magnet, an electric strike, etc. In one example, the security device 208 may un-lock a portion of the piece of network communication equipment based at least in part on the first data, and lock the portion of the piece of network communication equipment based at least in part on the second data. For example, the security device 208 may un-lock a portion of the piece of network communication equipment based at least in part on the first user 112 or the second user 114 starting to access the piece of network communication equipment and may lock the portion of the piece of network communication equipment based at least in part on the first user 112 or the second user 114 stopping access to the piece of network communication equipment. In another example, an adapter or connector (e.g., a circuit adapter or circuit connector) may include the security device 208. For example, the security device 208 may un-lock the adapter or connector to provide for removing the adapter or connector from a cooperating adapter or cooperating connector (e.g., cooperating receptacle, cooperating plug, cooperating socket, etc.). In another example, the security device 208 may un-lock or lock a portion of the piece of network communication equipment given an alarm state. For example, a breaker has tripped, an alarm fires notifying a server, a central server, a server system, a system, etc., and in this state the security device 208 may un-lock the breaker such that anyone could flip the switch back on to restore the equipment without checking in.

FIG. 2 illustrates the network communication equipment 202(1)-202(n) that may have a notification device 212. The notification device may send a notification to the first party 108 or the second party 110. The notification may notifying first party 108 or the second party 110 that the piece of network communication equipment is being accessed and/or the piece of network communication equipment is not being accessed.

FIG. 2 illustrates a server 214 may be communicatively coupled to one or more of the network communication equipment 202(1)-202(n). The server 214 may be operated by the second party 110. In one example, the second party 110 may remotely control the security device 208 to un-lock or lock the portion of a piece of network communication equipment. For example, the second party 110 may un-lock or lock a piece of equipment based on a particular user (e.g., the first user 112 or the second user 114), a particular period of time, a particular event, etc.

In one example, the monitor device 206 may comprise onboard removable storage storing the data associated with the access of the piece of network communication equipment. For example, the monitor device 206 may comprise an onboard removable storage that is removed from the monitor device 206 located in the customer room 200 for subsequently uploading the data associated with the access of the piece of network communication equipment to a server 214. In another example, the onboard removable storage may be removed from the monitor device 206 associated with the piece of network communication equipment located in the customer room 200, and the data may be subsequently uploaded to the server 214 according to a schedule or during a maintenance service of the network facility.

Example Fiber Optic System

Figure 3:
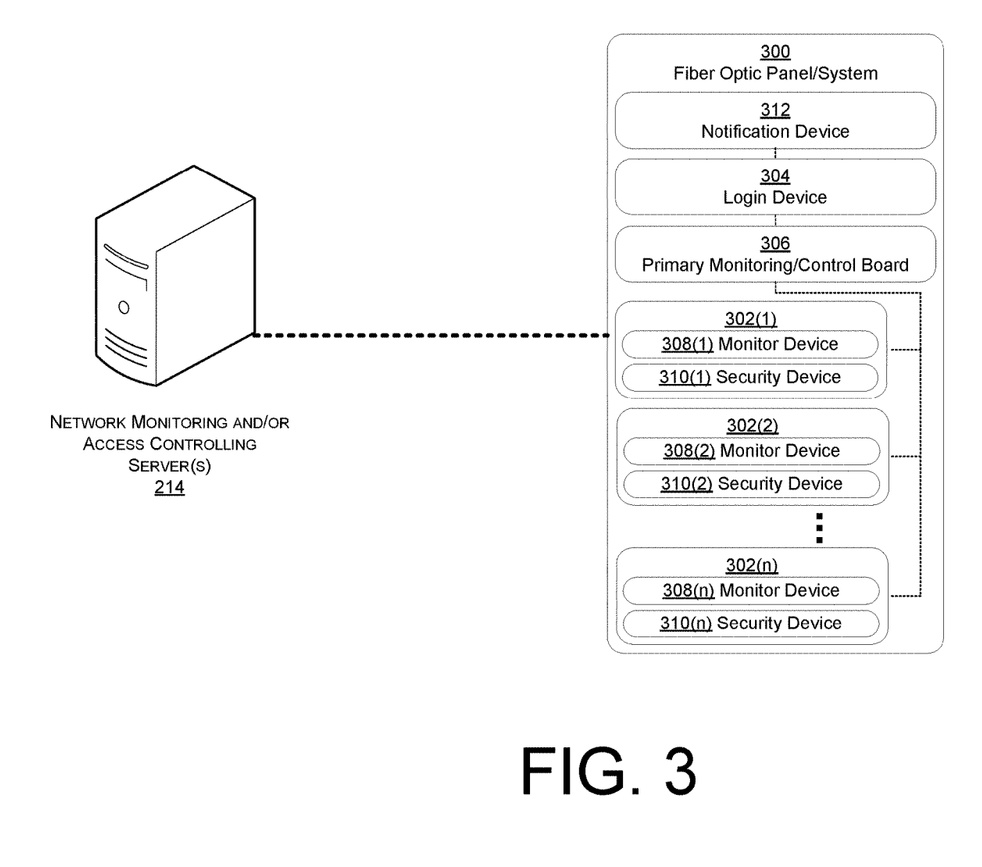
FIG. 3 illustrates an example implementation of a fiber optic system that may be disposed in the customer room shown in FIG. 1 or 2.

FIG. 3 illustrates an example implementation of a fiber optic panel 300 for use in the network facility 100. The fiber optic panel 300 can be one of the network communication equipment 202(1)-202($n$) shown in FIG. 2. FIG. 3 illustrates the fiber optic panel may be communicatively coupled to the server 214. The fiber optic panel 300 may have a plurality of trays 302(1), 302(2) through 302($n$). In one example, the trays 302(1)-302($n$) may be patch trays displaceably received in a chassis. In another example, the trays 302(1)-302($n$) may be cross connect trays displaceably received in a frame. The trays 302(1)-302($n$) may be removeably displaceable in a chassis or frame. For example, each of the trays 302(1)-302($n$) may be slideably displaceable, pivotably displaceable, etc., between a closed position and an open position. When in the closed position a tray is contained in the chassis or frame and when in the open position a tray is arranged outside of the chassis or frame. The fiber optic panel 300 may comprise a login device 304. The login device 304 can be the login device 204 shown in FIG. 2. The fiber optic panel 300 may comprise a primary monitoring device 306. The primary monitoring device 306 can be the monitor device 206 shown in FIG. 2. The login device 304 may be communicatively coupled to the primary monitoring device 306. The login device 304 or the primary monitoring device 306 may correlate the credential received from the first user 112 or the second user 114 with the data associated with an access of one or more of the trays 302(1)-302($n$).

FIG. 3 illustrates each of the trays 302(1)-302($n$) may have a monitor devices 308(1), 308(2), through 308($n$) communicatively coupled to the primary monitoring device 306. Each of the monitor devices 308(1)-308($n$) may be monitor boards arranged to monitor a respective security device 310(1), 310(2) through 310($n$). The security devices 310(1)-310($n$) can be the security device 208 illustrated in FIG. 2. Each security device 310(1)-310($n$) may be arranged with each of the trays 302(1)-302($n$). Each of the monitor devices 308(1)-308($n$) may receive a signal from each of the security devices 310(1)-310($n$) indicating that a security device is in an open state or a closed state. For example, when a tray is in the open position a monitoring device may receive a signal from the security device indicating that the security device is in an un-locked position, and when a tray is in the closed position a monitoring device may receive a signal from the security device indicating that the security device is in a locked position.

In some embodiments, the fiber optic panel 300 may include a notification device 312. The notification device 312 can be the notification device 212 shown in FIG. 2. The notification device 312 may receive a signal from the login device 304, the primary monitoring device 306, one or more of the monitor devices 308(1)-308($n$), and/or one or more of the security devices 310(0)-310($n$). Upon receiving a signal, the notification device 312 may send a notification to the first party 108 or the second party 110. Depending on which device (e.g., the login device 304, the primary monitoring device 306, one or more of the monitor devices 308(1)-308($n$), and/or one or more of the security devices 310(0)-310($n$)) sent the signal, the notification may notifying the first party 108 or the second party 110 that the fiber optic panel 300 and/or at least one of the trays 302(1)-302($n$) is being accessed.

Example Power Distribution System

Figure 4:
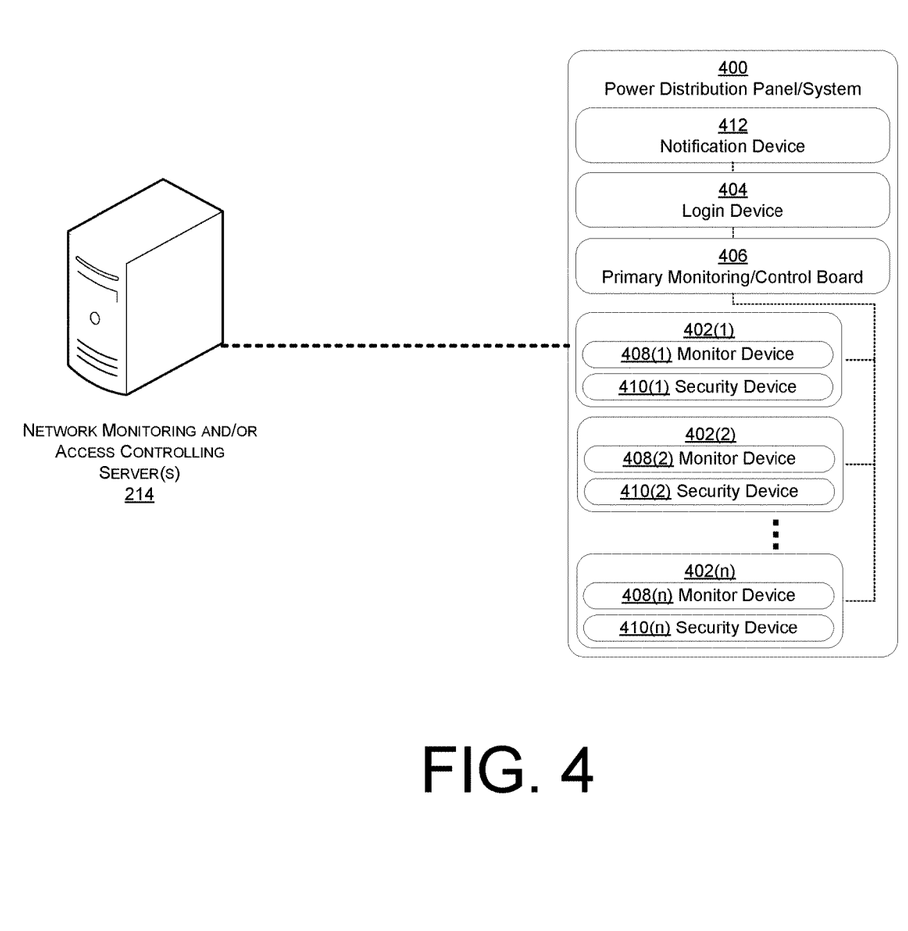
FIG. 4 illustrates an example implementation of a power distribution system that may be disposed in the customer room shown in FIG. 1 or 2.

FIG. 4 illustrates an example implementation of a power distribution panel 400 for use in the network facility 100. The power distribution panel 400 can be one of the network communication equipment 202(1)-202($n$) shown in FIG. 2. FIG. 4 illustrates the power distribution panel 400 may be communicatively coupled to the server 214. The power distribution panel 400 may have a plurality of power protection devices 402(1), 402(2) through 402($n$). In one example, the power protection devices 402(1)-402($n$) may be breakers switchably arranged in a front face of a chassis. For example, each of the breakers may be switched between an open or closed position on the front face of the chassis. In another example, the power protection devices 402(1)-402($n$) may be fuses (e.g., GMTs) removeably received in a front face of a chassis. For example, each of the fuses may be removeably inserted into a receptacle on the front face of the chassis. The fiber optic panel 300 may comprise a login device 404. The login device 404 can be the login device 204 shown in FIG. 2. The power distribution panel 400 may comprise a primary monitoring device 406. The primary monitoring device 406 can be the monitor device 206 shown in FIG. 2. The login device 404 may be communicatively coupled to the primary monitoring device 406. The login device 404 or the primary monitoring device 406 may correlate the credential received from the first user 112 or the second user 114 with the data associated with an access of one or more of the power protection devices 402(1)-402($n$).

FIG. 4 illustrates each of the power protection devices 402(1)-402($n$) may have a monitor device 408(1), 408(2), through 408($n$) communicatively coupled to the primary monitoring device 406. Each of the monitor device 408(1)-408($n$) may be monitor boards arranged to monitor a respective security device 410(1), 410(2) through 410($n$). The security devices 410(1)-410($n$) can be the security device 208 illustrated in FIG. 2. Each security device 410(1)-410($n$) may be arranged with each of the power protection devices 402(1)-402($n$). Each of the monitor devices 408(1)-408($n$) may receive a signal from each of the security devices 410(1)-410($n$) indicating that a security device is in an open state or a closes state. For example, a cover may be arranged with one or more of the power protection devices 402(1)-402($n$), and when the cover is in an open position a monitoring device may receive a signal from the security device indicating that the security device is in an un-locked position, and when the cover is in the closed position a monitoring device may receive a signal from the security device indicating that the security device is in a locked position.

In some embodiments, the power distribution panel 400 may include a notification device 412. The notification device 412 can be the notification device 212 shown in FIG. 2. The notification device 412 may receive a signal from the login device 404, the primary monitoring device 406, one or more of the monitor devices 408(1)-408($n$), and/or one or more of the security devices 410(0)-410($n$). Upon receiving a signal, the notification device 412 may send a notification to the first party 108 or the second party 110. Depending on which device (e.g., the login device 404, the primary monitoring device 406, one or more of the monitor devices 408(1)-408($n$), and/or one or more of the security devices 410(0)-410($n$)) sent the signal, the notification may notifying the first party 108 or the second party 110 that the power distribution panel 400 and/or at least one of the protection devices 402(1)-402(n) is being accessed.

Example Management System

Figure 5:
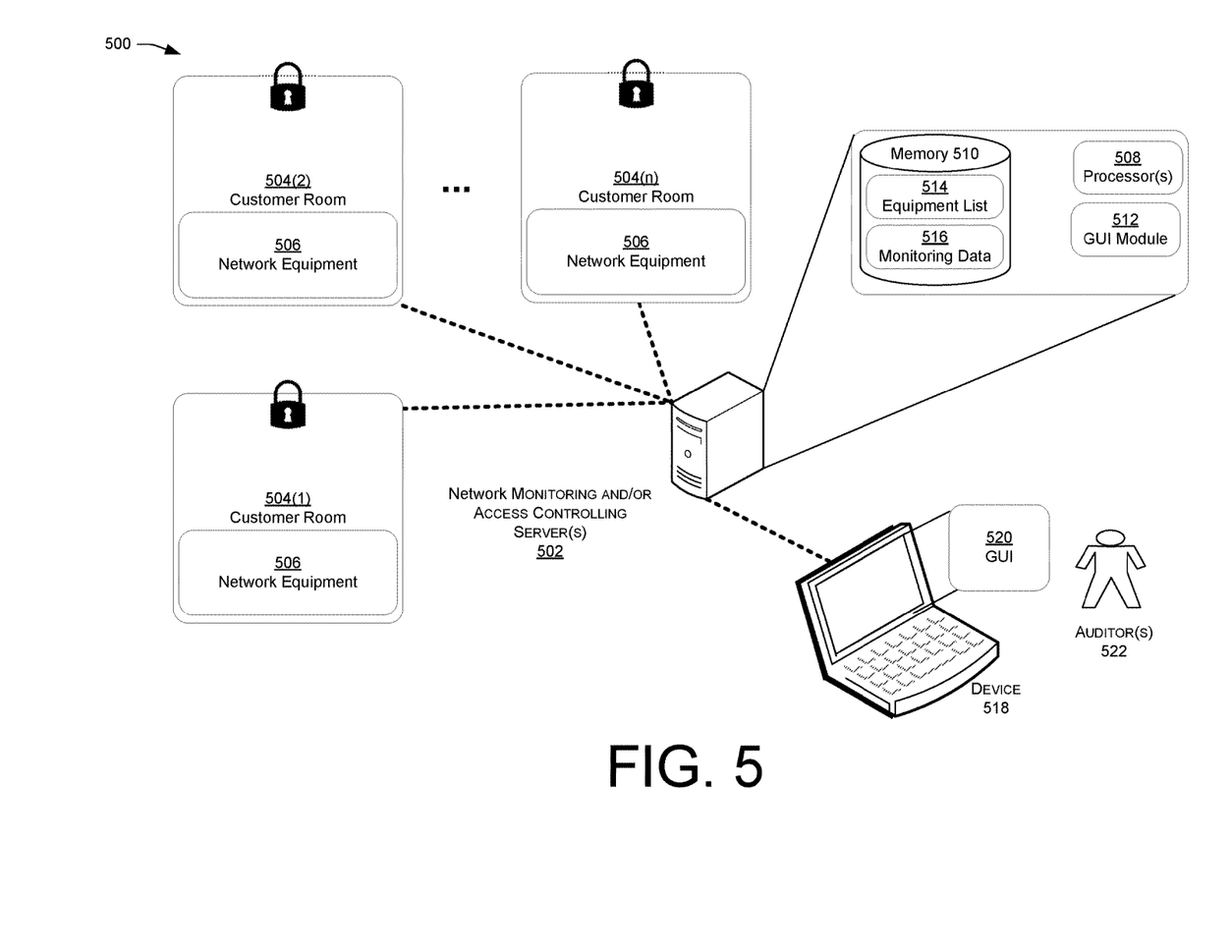
FIG. 5 illustrates an example implementation of a network communication network infrastructure communicatively coupled with a network communication monitoring and/or access controlling server, along with a user device displaying a network communication monitoring and/or access controlling GUI provided by the network communication monitoring and/or access controlling server.

FIG. 5 illustrates an example implementation of a network communication network infrastructure 500 having a network communication monitoring and/or controlling server 502. The server 502 may be for managing an access to network communication equipment disposed in customer rooms 504(1), 504(2) through 504(n) at varying levels of granularity. The example implementations of the customer rooms 504(1)-504(n) can be customer room 200 shown in FIG. 2. FIG. 5 illustrates the server 502 may be communicatively connected with a plurality of network communication equipment 506. For example, the server 502 may be communicatively connected with a plurality of central boards located at a respective customer room 504(1)-504(n). While FIG. 5 illustrates the server 502 being communicatively connected with three pieces of network communication equipment 506, each located in a respective customer room 504(1)-504(n), the server 502 may be communicatively connected with any number of network communication equipment located at respective customer rooms. FIG. 5 illustrates the server 502 may comprise a processor(s) 508, memory 510, and a GUI module 512. The memory 510 may be configured to store instructions executable on the processor(s) 508, and may comprise a network communication equipment list 514 and monitoring data 516. FIG. 5 further illustrates the server 502 communicatively connected with a user device 518 displaying a GUI 520 to an auditor(s) 522.

The memory 510 may store instructions that are executable on the processor(s) 508 and that are configured to provide data associated with the access of the piece of network communication equipment that is auditable by an auditor 522. The example implementation of the auditor 522 can be the second party 110 shown in FIG. 1.

In addition, the memory 510 may store instructions executable on the processor(s) 508 to receive data from the network communication equipment 506, respectively. The received data may comprise a plurality of reported accessing events, each reported accessing event being identified with a respective piece of network communication equipment 506. Further, the server 502 memory 510 storing instructions executable on the processor(s) 508 may be configured to integrate the received data from the network communication equipment 506 located at customer rooms 504(1)-504(n), respectively. For example, the server 502 may integrate data from individual monitors (e.g., monitor devices 206). The memory 510 may also store instructions executable on the processor(s) 508 to provide a GUI (e.g., GUI 520). The GUI may be configured to allow a user (e.g., an auditor(s) 522) to audit data associated with the access of each of the pieces of network communication equipment of each customer room in each network facility. For example, the GUI may allow a user to audit access events of each piece of network communication equipment at a tray, a circuit (e.g., a single fiber optic transmission path for transmitting data), a switch, a breaker, a fuse, etc. level, compare failures, errors, maintenance issues, etc. of particular pieces of network communication equipment, compare failures, errors, maintenance issues, etc. of a particular piece of network communication equipment across network facilities, or compare failures, errors, maintenance issues, etc. of a particular piece of network communication equipment across technicians. The GUI may also allow a user to audit a servicing of network communication equipment or audit maintenance of network communication maintenance. The GUI may additionally or alternatively provide how long a piece of network communication equipment was accessed, or determine if an individual adapter, switch, breaker, fuse, tray, etc. was moved or displaced, amongst other notifications.

Example Fiber Optic Systems

Figure 6:
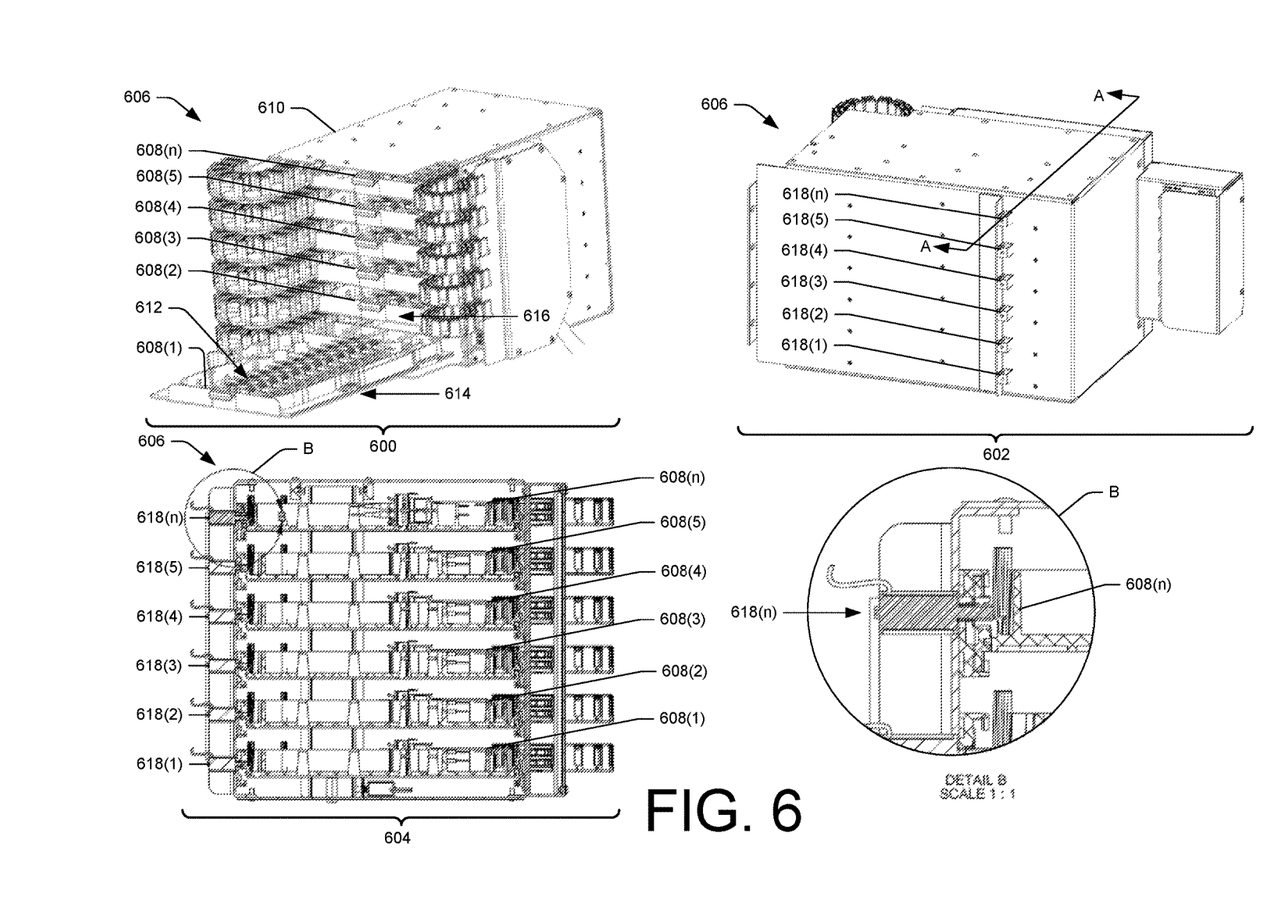
FIG. 6 illustrates a perspective front side view, a perspective back side view, and a section view of an example fiber optic system that may be disposed in the customer room shown in FIG. 1 or 2.

FIG. 6 is a perspective front side view 600, a perspective back side view 602, and a section view 604 of an example fiber optic system 606 that may be disposed in a customer room (e.g., customer rooms 102(1)-102(n) shown in FIG. 1 or customer room 200 shown in FIG. 2). The perspective front side view 600 shows a plurality of trays 608(1), 608(2), 608(3), 608(4), 608(5) through 608(n) removeably received by a chassis 610. In one example, the plurality of trays 608(1)-608(n) may be patch trays having a plurality of connectors 612 (e.g., Lucent Connectors (LCs), subscriber connectors (SC), etc.)). The perspective front side view 600 shows tray 608(1) arranged in an open position 614 where the tray 608(1) is positioned in front of a chassis 610. The perspective front side view 600 also shows the trays 608(2)-608(n) arranged in a closed position 616 where the trays 608(2)-608(n) are positioned inside the chassis 610.

The perspective back side view 602 shows a plurality of security devices 618(1), 618(2), 618(3), 618(4), 618(5) through 618(n) arranged on a back side surface of the chassis 610. The example implementation of the security devices 618(1)-618(n) can be the security device 208 shown in FIG. 2. Each of the security devices 618(1)-618(n) are arranged with a respective tray of the plurality of trays 608(1)-608(n). The perspective back side view 602 shows a section line A-A taken proximate to the security devices 618(1)-618(n).

The section view 604 shows each of the security devices 618(1)-618(n) may be arranged with a respective tray of the plurality of trays 608(1)-608(n). For example, each of the security devices 618(1)-618(n) may interface with a respective portion of each tray of the plurality of trays 608(1)-608(n) such that when a tray (e.g., tray 608(1)) is in the open position 614, a security device 618(1) may be in an open state or un-locked position, and when a tray (e.g., tray 608(2)) is in the closed position 616, a security device (e.g., security device 618(2)) may be in a closed state or locked position.

The section view 604 shows a detail view B taken about the security device 618(n) in closed state or locked position with tray 608(n). Detail view B illustrates the interface with the tray 608(n) in more detail, and shows the security device 618(n) may be an electronic lock. The electronic lock may be a solenoid, solenoid bolt, an electro-magnet, an electric strike, etc.

Figure 7:
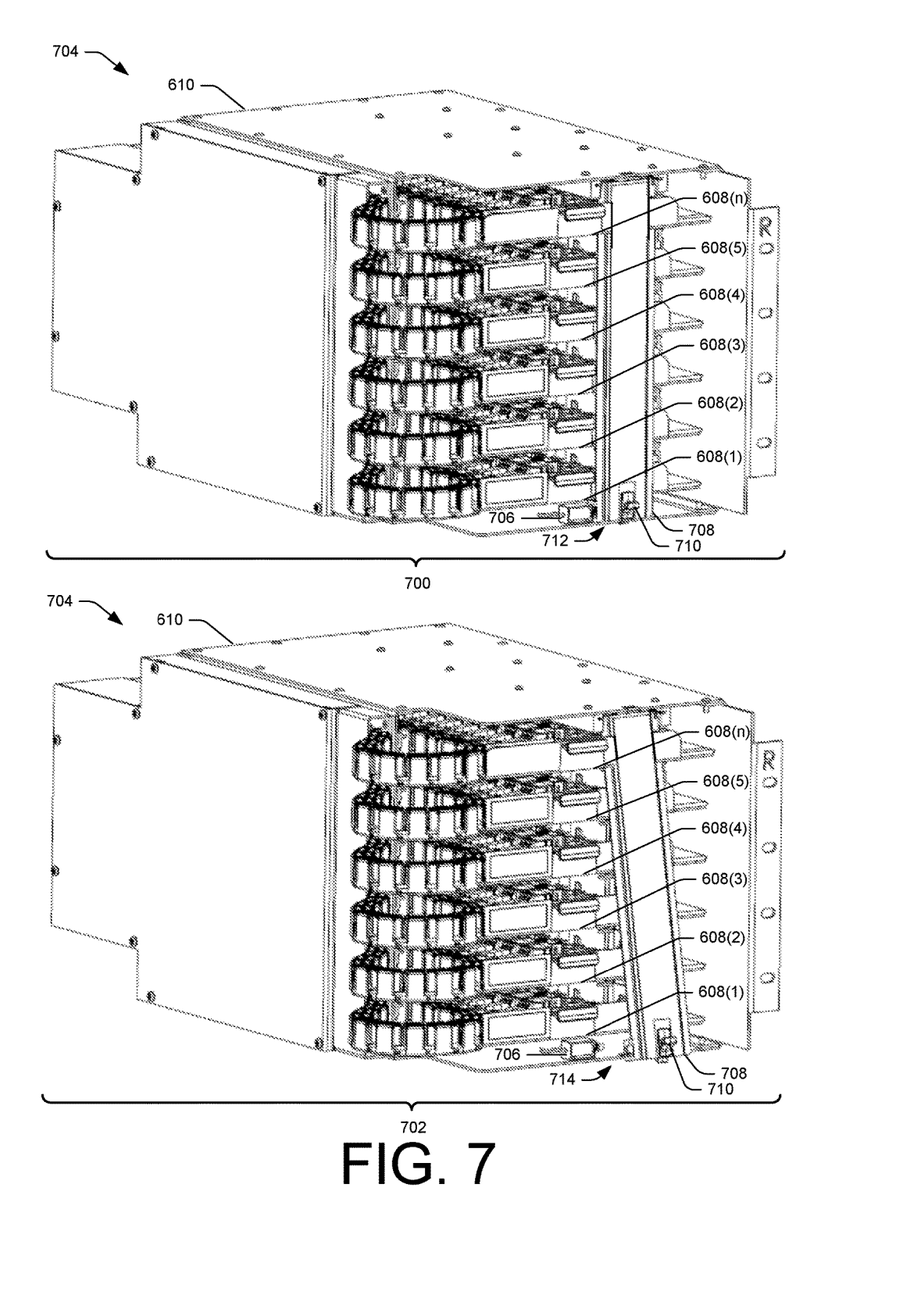
FIG. 7 illustrates perspective front side views of another example fiber optic system that may be disposed in the customer room shown in FIG. 1 or 2.

FIG. 7 illustrates perspective front side views 700 and 702 of another example fiber optic system 704 that may be disposed in a customer room (e.g., customer rooms 102(1)-102(n) shown in FIG. 1 or customer room 200 shown in FIG. 2). The perspective front side views 700 and 702 show the plurality of trays 608(1)-608(n) removeably received by the chassis 610. The perspective front side views 700 and 702 show a security device 706 arranged on a front side surface of the chassis 610. The example implementation of the security device 706 can be a security device 618(n) shown in FIG. 6. The security device 706 can be arranged with a cover 708 arranged with the plurality of trays 608(1)-608(n). The cover 708 may include a latch 710 arranged to open or close the cover 708. Front side view 700 shows the cover 708 in a closed position 712. When the cover 708 is arranged in the closed position 712, the trays 608(2)-608(n) are positioned inside the chassis 610 and the security device 706 may be arranged with a portion of the cover 708. For example, the security device 706 may interface with the respective portion of the cover 708 such that when the cover 708 is in the closed position 712, the security device 706 may be in a closed state or locked position. While FIG. 7 illustrates the security device 706 and cover 708 arranged with trays 608(2)-608(n) of the fiber optic system 606, the security device 706 and cover 708 may be arranged with connections of a bulkhead. For example, the security device 706 and the cover 708 may be arranged with an LGX style fiber optic panel having a panel with fiber optic adapters arrayed along the panel. In this example, where the security device 706 and the cover 708 are arranged with fiber optic adapters arrayed along the panel, the cover 708 may cover the fiber optic adapters arrayed along the panel when in the closed position. Moreover, the panel may be about 1, 2, 3, or 4 rack units (RUs) in height.

Front side view 702 shows the cover 708 in an open position 714. When the cover 708 is arranged in the open position 714, the trays 608(2)-608(n) may be slideably displaceable from the inside the chassis 610 to the open position 614, and the security device 706 may be not be arranged with the portion of the cover 708. For example, the security device 706 may not interface with the respective portion of the cover 708 such that when the cover 708 is in the open position 710, the security device 706 may be in an open state or un-locked position.

Figure 8:
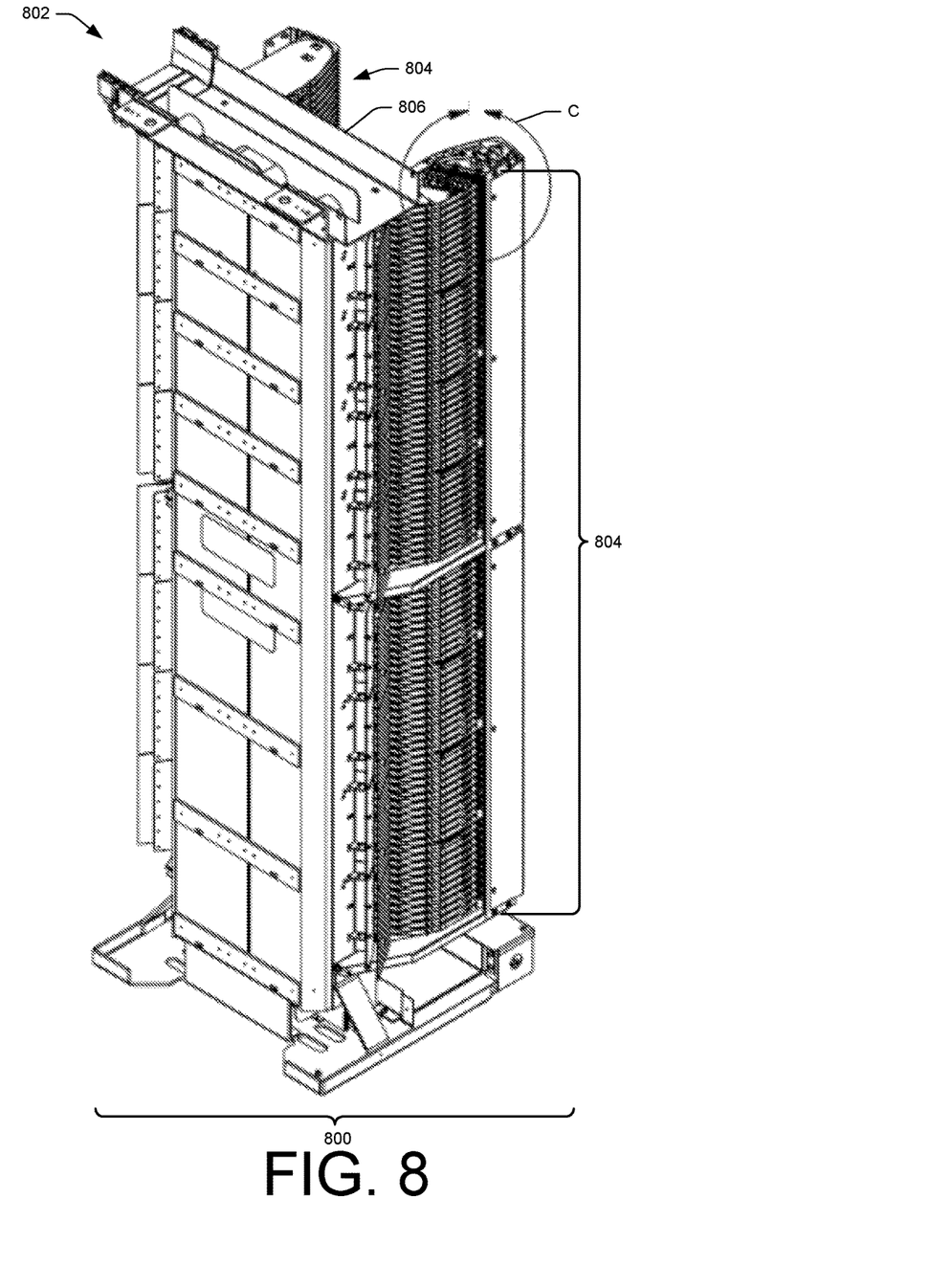
FIG. 8 illustrates a perspective side view of another example fiber optic system that may be disposed in the customer room shown in FIG. 1 or 2.

FIG. 8 illustrates a perspective side view 800 of another example fiber optic system 802 that may be disposed in a customer room (e.g., customer rooms 102(1)-102(n) shown in FIG. 1 or customer room 200 shown in FIG. 2). The perspective side view 800 shows a plurality of trays 804 removeably received by a frame 806. In this example, each of the plurality of trays 804 are pivotably displaceable between a closed position and an open position. In one example, the plurality of trays 804 may be cross connect trays having a plurality of connectors. The perspective side view 800 shows a detail view C taken about a top portion of the frame 806.

Figure 9:
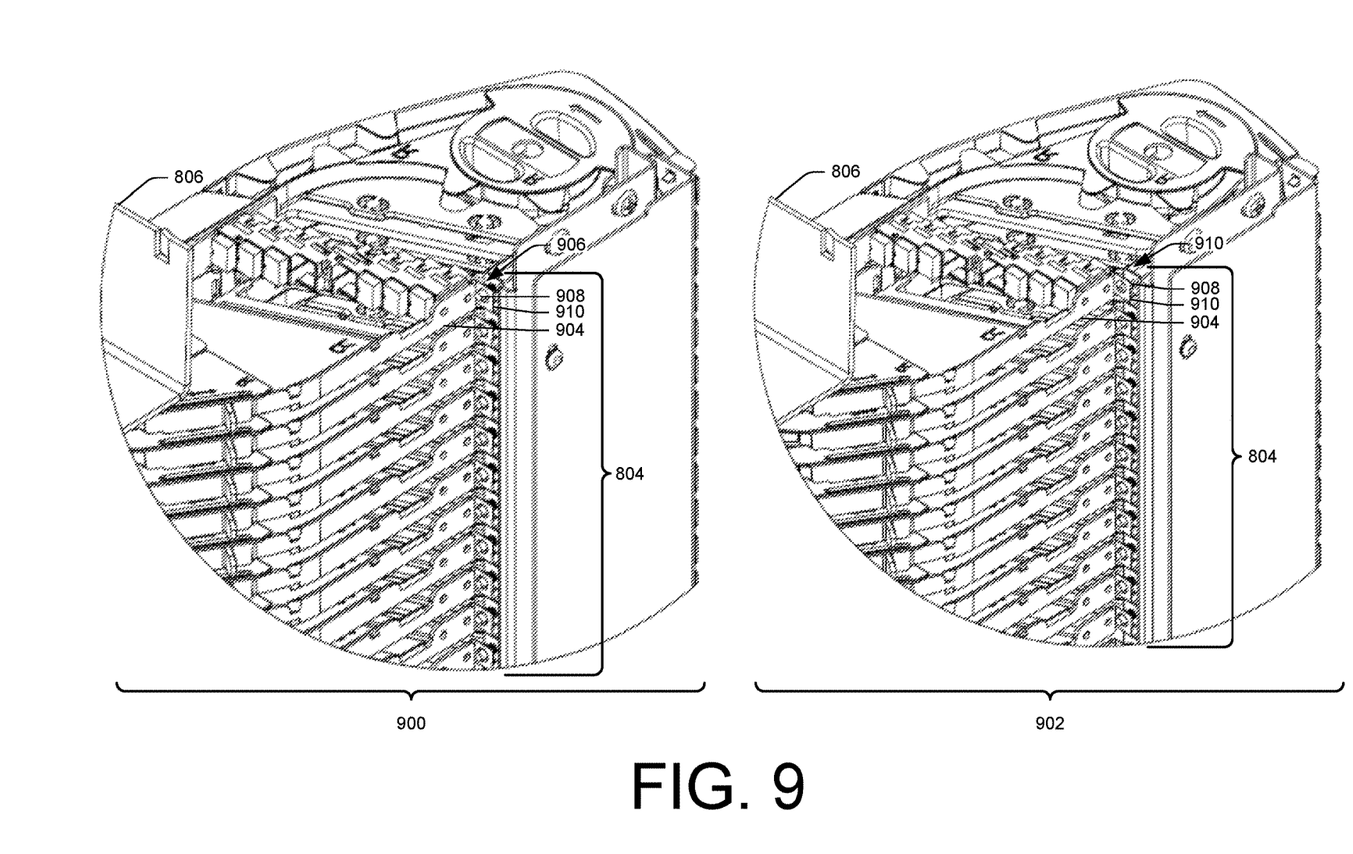
FIG. 9 illustrates detail views of a security device of the example fiber optic system shown in FIG. 8.

FIG. 9 illustrates detail views 900 and 902 representing the detail view C taken about the top portion of the frame 806. Detail views 900 and 902 show the plurality of trays 804 in more detail. Detail view 900 shows a tray 904 of the plurality of trays 804 in a closed position 906. When the tray 904 is arranged in the closed position 906, the tray 904 may be positioned inside the frame 806 and a security device 908 may be arranged with a portion 910 of the tray 906. For example, the security device 908 may interface with the portion 910 of the tray 904 such that when the tray 904 is in the closed position 906, the security device 908 may be in a closed state or locked position. In this example, the security device 908 may penetrate an aperture arranged in the portion 910 of the tray 904. Detail views 900 and 902 illustrates the security device 908 may be an electronic lock. The electronic lock may be a solenoid, solenoid bolt, an electro-magnet, an electric strike, etc.

Detail view 902 shows the tray 904 in an open position 912. When the tray 904 is arranged in the open position 912, the tray 904 may be positioned outside the frame 806 and the security device 908 may not be arranged with the portion 910 of the tray 904. For example, the security device 908 may not interface with the portion 910 of the tray 904 such that when the tray 904 is in the open position 910, the security device 908 may be in an open state or un-locked position. In this example, the security device 908 may not penetrate the aperture arranged in the portion 910 of the tray 904.

Example Power Distribution Systems

Figure 10:
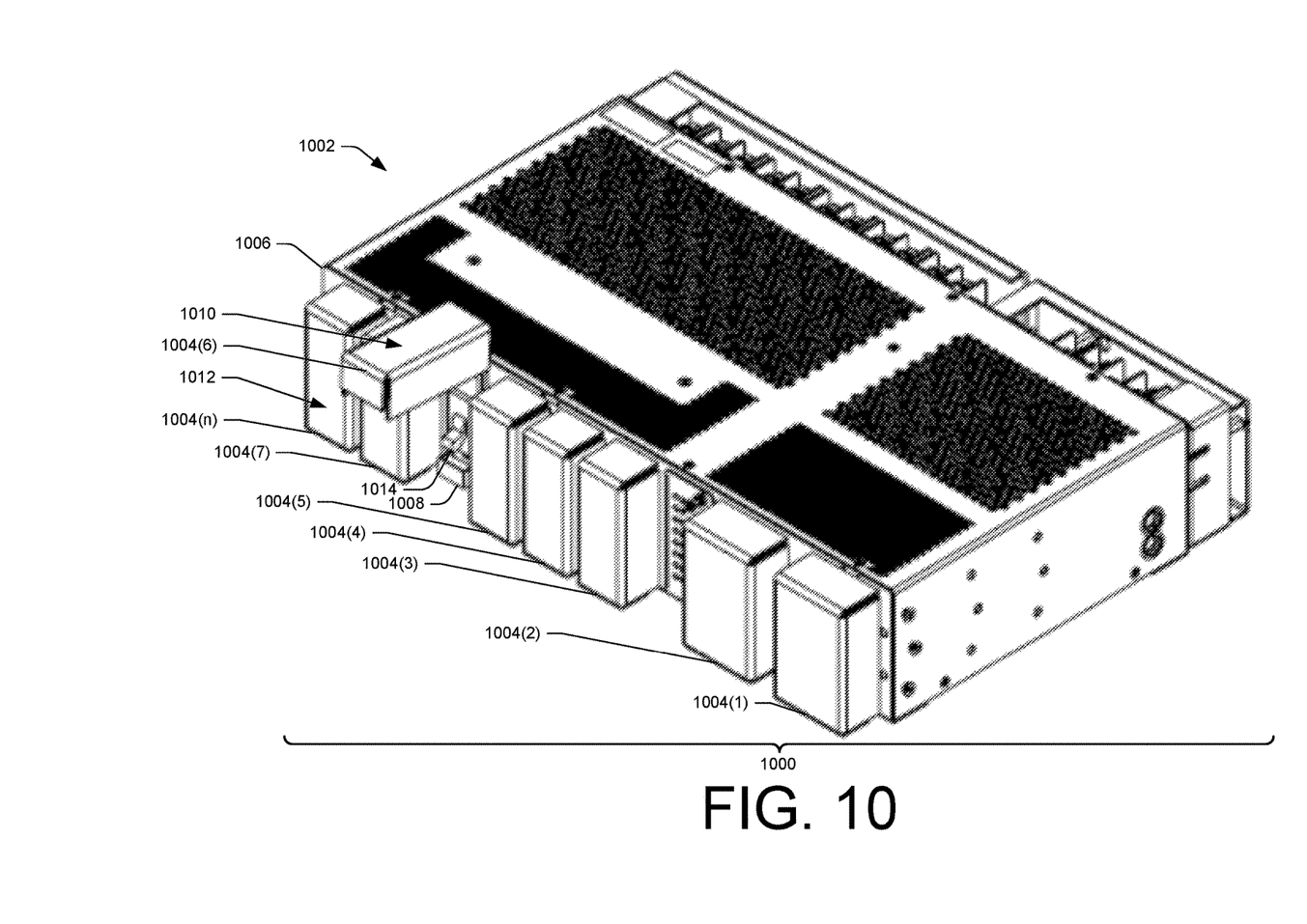
FIG. 10 illustrates a perspective front side view of an example power distribution system that may be disposed in the customer room shown in FIG. 1 or 2.

FIG. 10 is a perspective front side view 1000 of an example power distribution system 1002 that may be disposed in a customer room (e.g., customer rooms 102(1)-102(n) shown in FIG. 1 or customer room 200 shown in FIG. 2). The example implementation of the power distribution system 1002 can be the power distribution system 400 shown in FIG. 4. The perspective front side view 1000 shows a plurality of covers 1004(1), 1004(2), 1004(3), 1004(4), 1004(5), 1004(6), 1004(7) through 1004(n) arranged on a front side surface of a chassis 1006 of the power distribution system 1002. A security device 1008 may be arranged with each of the covers 1004(1)-1004(n). For example, each security device 1008 may interface with a respective portion of each of the covers 1004(1)-1004(n) such that when a cover (e.g., cover 1004(6)) is in an open position 1010, a security device 1008 may be in an open state or un-locked position, and when a cover (e.g., cover 1004(n)) is in the closed position 1012, a security device 1008 may be in a closed state or locked position. The example implementation of the security devices 1008 can be the security device 208 shown in FIG. 2. The security device 1008 may be an electronic lock. The electronic lock may be a solenoid, solenoid bolt, an electro-magnet, an electric strike, etc.

The perspective front side view 1000 shows the security device 1008 may be arranged with a respective power protection device 1014. The example implementation of the power protection device 1008 can be one of the plurality power protection devices 402(1)-402(n) shown in FIG. 4. For example, the power protection device 1008 may be a breaker or switch.

Figure 11:
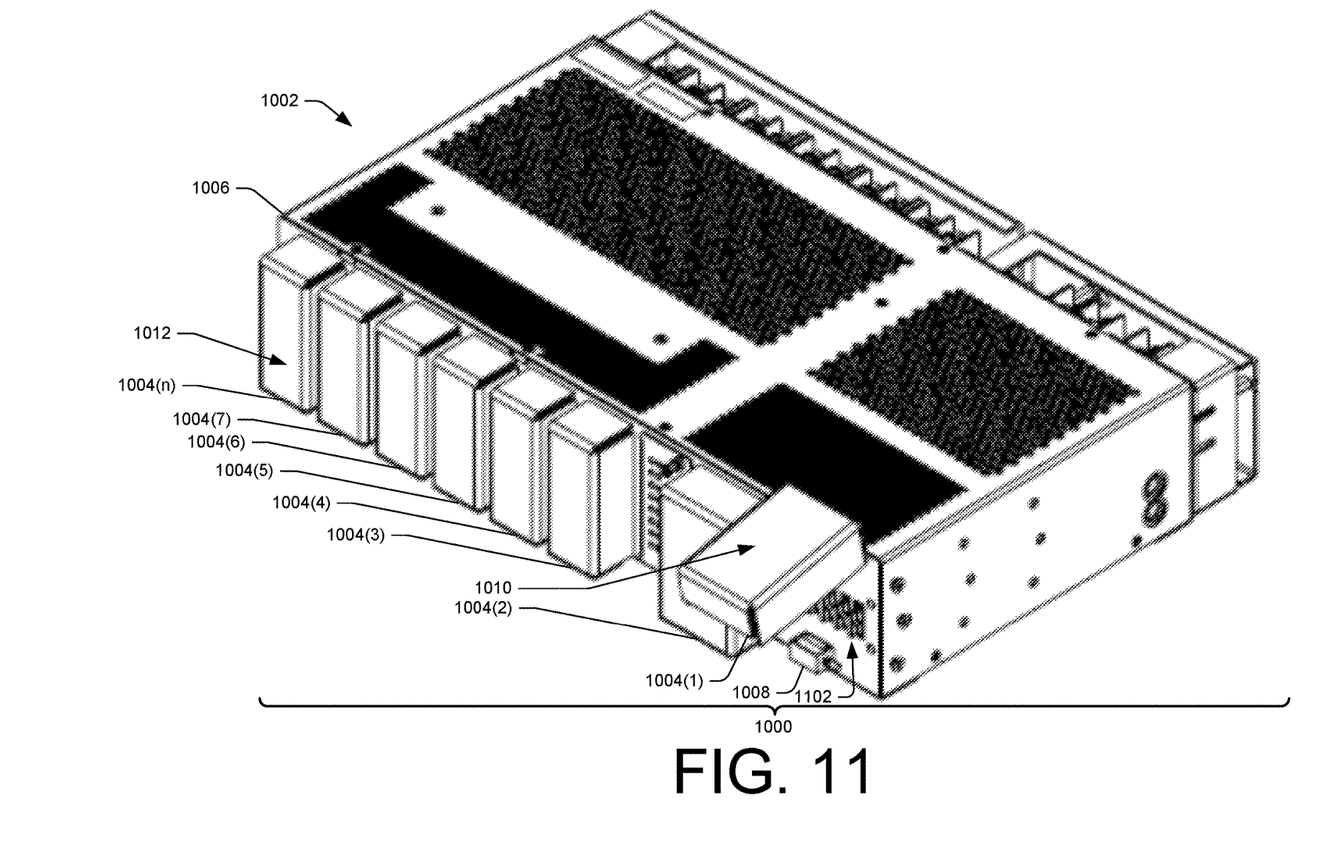
FIG. 11 illustrates the perspective front side view of the example power distribution system shown in FIG. 10 having a power protection device.

FIG. 11 illustrates the perspective front side view 1000 of the example power distribution system 1002 shown in FIG. 10. FIG. 11 illustrates the security device 1008 may be arranged with one or more power protection devices 1102. The example implementation of the power protection devices 1102 can be one of the plurality power protection devices 402(1)-402(n) shown in FIG. 4. For example, the power protection device 1102 may be a fuses (e.g., GMTs) removeably received in the front of the chassis 1006.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A network facility comprising:
   a room arranged in the network facility, the room having controlled access to the room;
   a panel disposed in the room, the panel comprising an interface to provide power and/or communication for a piece of network communication equipment;
   the piece of network communication equipment disposed in the room and communicatively coupled to the panel;
   a login device associated with the piece of network communication equipment, the login device to receive a credential of a user to access the piece of network communication equipment; and
   a monitor device associated with the piece of network communication equipment, the monitor device to:
   receive data associated with an access, by the user, of the piece of network communication equipment, the data indicating what occurred during access to the piece of network communication equipment, and the data including:

first data indicating a time that the user started accessing the piece of network communication equipment, and second data indicating a time that the user stopped accessing the piece of network communication equipment, and store the data associated with the access of the piece of network communication equipment.

2. The network facility of claim 1, further comprising a security device arranged with the piece of network communication equipment, the security device to un-lock or lock a portion of the piece of network communication equipment based at least in part on the credential received from the user.

3. The network facility of claim 2, wherein the security device comprises an electronic lock.

4. The network facility of claim 2, wherein the piece of network communication equipment is communicatively coupled with a server associated with a second party, and the server being configured to receive input from the second party and control the security device to un-lock or lock the portion of the piece of network communication equipment.

5. The network facility of claim 1, wherein the data further includes:
third data representing the user starting to access the piece of network communication equipment; and
fourth data representing the user stopping access to the piece of network communication equipment; and
wherein the network facility further comprises a security device arranged with the piece of network communication equipment, the security device to un-lock a portion of the piece of network communication equipment based at least in part on the third data, and lock the portion of the piece of network communication equipment based at least in part on the fourth data.

6. The network facility of claim 1, wherein the piece of network communication equipment comprises a fiber optic panel or a power panel.

7. The network facility of claim 1, wherein the monitor device associated with the piece of network communication equipment includes onboard removable storage storing the data associated with the access of the piece of network communication equipment, and wherein the onboard removable storage is removed from the monitor device located in the room arranged in the network facility for subsequently uploading the data associated with the access of the piece of network communication equipment to a server operated by the second party.

8. The network facility of claim 7, wherein the onboard removable storage is removed from the monitor device associated with the piece of network communication equipment located in the room arranged in the network facility and the data is subsequently uploaded to the server operated by the second party according to a schedule or during a maintenance service of the network facility.

9. The network facility of claim 1, wherein the login device receives the credential of the user via a radio-frequency identification (RFID), a keypad, a key fob, or a smart card.

10. The network facility of claim 1, wherein the login device receives the credential of the user via a mobile application or a Bluetooth application.

11. The network facility of claim 1, further comprising a notification device associated with the piece of network communication equipment, the notification device to send a notification that the user has accessed the piece of network communication equipment.

12. The network facility of claim 1, wherein the data associated with the access indicates that the user has accessed a tray, a circuit, a switch, a breaker or a fuse of the piece of network communication equipment.

13. The network facility of claim 1, wherein the monitor device is to further receive data associated with a change of a position of the piece of network communication equipment.

14. A network facility comprising:
a room arranged in the network facility, the room having controlled access to the room;
a panel disposed in the room, the demarcation comprising an interface to provide communication for a fiber optic system;
the fiber optic system disposed in the room and communicatively coupled to the panel;
a login device associated with the fiber optic system, the login device to receive a credential of a user to access the fiber optic system;
a security device arranged with the fiber optic system, the security device to un-lock or lock a portion of the fiber optic system based at least in part on the credential received from the user; and
a monitor device associated with the fiber optic system, the monitor device to:
receive data associated with an access, by the user, of the fiber optic system, the data indicating what occurred during access to the fiber optic system; and
store the data associated with the access of the fiber optic system;
wherein the fiber optic system is communicatively coupled with a server associated with a second party, and the server being configured to receive input from the second party and control the security device to un-lock or lock the portion of the fiber optic system.

15. The network facility of claim 14, wherein the fiber optic system comprises a plurality of patch trays displaceably received in a chassis, and the monitor device receives data associated with an access, by the user, of at least one patch tray of the plurality of patch trays.

16. The network facility of claim 14, wherein the fiber optic system comprises a plurality of patch trays or splice trays displaceably received in a chassis, and further comprising a security device arranged with at least one patch tray of the plurality of patch trays or with at least one splice tray of the plurality splice trays, the security device to un-lock or lock the at least one patch tray or the at least one splice tray based at least in part on the credential received from the user.

17. The network facility of claim 14, wherein the fiber optic system comprises a plurality of cross connect trays displaceably received in a frame, and the monitor device receives data associated with an access, by the user, of at least one cross connect tray of the plurality of cross connect trays.

18. The network facility of claim 14, wherein the fiber optic system comprises a plurality of cross connect trays displaceably received in a frame, and further comprising a security device arranged with at least one cross connect tray of the plurality of cross connect trays, the security device to un-lock or lock the at least one cross connect tray based at least in part on the credential received from the user.

19. The network facility of claim 14, wherein the access of the fiber optic system comprises access to a tray of the fiber optic system.

20. A network facility comprising:
a room arranged in the network facility, the room having controlled access to the room;

a panel disposed in the room, the panel comprising an interface to provide power and/or communication for a power distribution system;

the power distribution system disposed in the room and communicatively coupled to the panel, the power distribution system including a plurality of power protection devices arranged in a front of the power distribution system;

a login device associated with the power distribution system, the login device to receive a credential of a user to access the power distribution device;

a monitor device associated with the power distribution system, the monitor device to:
  receive data associated with an access, by the user, of the power distribution system, the data indicating what occurred during access to the power distribution device; and
  store the data associated with the access of the power distribution device,
  wherein the monitor device receives data associated with an access, by the user, of at least one power protection device of the plurality of power protection devices.

21. The network facility of claim 20, further comprising a security device arranged with the power distribution system, the security device to un-lock or lock a portion of the power distribution system based at least in part on the credential received from the user.

22. The network facility of claim 21, wherein the power distribution system is communicatively coupled with a server associated with a second party, and the server being configured to receive input from the second party and control the security device to un-lock or lock the portion of the power distribution system.

23. The network facility of claim 20, further comprising a security device arranged with the at least one power protection device of the plurality of power protection devices, the security device to un-lock or lock the at least one power protection device based at least in part on the credential received from the user.

24. The network facility of claim 20, wherein the access of the power distribution system comprises access to a breaker or a fuse.

25. A system comprising:
  a piece of network communication equipment arrangeable in a room of a network facility, the piece of network communication equipment communicatively coupleable to a panel disposed in the room;
  a login device associated with the piece of network communication equipment, the login device to receive a credential of a user;
  a monitor device associated with the piece of network communication equipment, the monitor device to:
    receive data associated with an access, by the user, of the piece of network communication equipment, the data indicating what occurred during access to the piece of network communication equipment; and
    store the data associated with the access of the piece of network communication equipment; and
  a security device arranged with the piece of network communication equipment to un-lock or lock a portion of the piece of network communication equipment based at least in part on the credential received from the user,
  wherein the piece of network communication equipment is communicatively coupled with a server associated with a second party, and the server being configured to receive input from the second party and control the security device to un-lock or lock the portion of the piece of network communication equipment.

* * * * *